United States Patent
Feisthammel et al.

(10) Patent No.: US 6,833,022 B2
(45) Date of Patent: Dec. 21, 2004

(54) METHOD AND DEVICE FOR FILTERING CONTAMINATED AIR

(75) Inventors: Egon Feisthammel, Rastatt (DE); Dieter Rosmann, Stuttgart (DE)

(73) Assignee: BSH Bosch und Siemens Hausgerate GmbH, Munich (DE)

(*) Notice: Subject to any disclaimer, the term of this patent is extended or adjusted under 35 U.S.C. 154(b) by 0 days.

(21) Appl. No.: 10/725,093

(22) Filed: Dec. 1, 2003

(65) Prior Publication Data

US 2004/0107834 A1 Jun. 10, 2004

Related U.S. Application Data

(63) Continuation of application No. PCT/EP02/05935, filed on May 29, 2002.

(30) Foreign Application Priority Data

Jun. 1, 2001 (DE) .......................................... 101 26 842

(51) Int. Cl.[7] .......................... B01D 53/04; B01D 50/00
(52) U.S. Cl. .............................. 95/91; 95/117; 95/141; 95/287; 96/119; 96/132; 96/135; 96/138; 96/139; 96/151; 96/153; 55/325; 55/337; 55/385.1; 55/444; 55/DIG. 13; 55/DIG. 36
(58) Field of Search .......................... 95/91, 117, 118, 95/141, 273, 286, 287; 96/108, 118–120, 151, 132–139, 153, 154; 55/320, 325, 337, 385.1, 440, 443, 444, DIG. 13, DIG. 36

(56) References Cited

U.S. PATENT DOCUMENTS

| | | | | |
|---|---|---|---|---|
| 2,195,565 A | * | 4/1940 | Fricke | 96/132 |
| 2,273,779 A | * | 2/1942 | Dickey et al. | 55/441 |
| 2,916,103 A | * | 12/1959 | Daugherty | 96/120 |
| 3,246,454 A | * | 4/1966 | Norton | 96/118 |
| 3,837,269 A | * | 9/1974 | Sweet et al. | 126/299 E |
| 3,910,782 A | | 10/1975 | Struble et al. | |
| 4,235,220 A | * | 11/1980 | Hepner | 126/299 D |
| 4,350,504 A | * | 9/1982 | Diachuk | 422/105 |
| 4,388,086 A | * | 6/1983 | Bauer et al. | 95/118 |
| 4,610,705 A | * | 9/1986 | Sarnosky et al. | 96/135 |
| 4,753,218 A | * | 6/1988 | Potter | 126/299 E |
| 4,785,725 A | * | 11/1988 | Tate et al. | 99/330 |
| 4,801,313 A | * | 1/1989 | Mann | 96/126 |
| 4,854,949 A | * | 8/1989 | Giles et al. | 96/58 |
| 4,897,095 A | * | 1/1990 | Bedi et al. | 96/135 |
| 4,902,316 A | * | 2/1990 | Giles et al. | 96/58 |
| 4,921,509 A | * | 5/1990 | Maclin | 96/18 |
| 5,288,469 A | * | 2/1994 | Skalla | 422/171 |
| 5,423,903 A | * | 6/1995 | Schmitz et al. | 96/134 |
| 5,657,744 A | | 8/1997 | Vianen | |
| 6,235,090 B1 | * | 5/2001 | Bernstein et al. | 96/57 |
| 2002/0194991 A1 | * | 12/2002 | Olsson et al. | 95/118 |
| 2003/0164093 A1 | * | 9/2003 | Brownell et al. | 95/268 |
| 2003/0192433 A1 | * | 10/2003 | Steiner | 95/287 |

FOREIGN PATENT DOCUMENTS

| | | |
|---|---|---|
| DE | 27 20 201 C2 | 11/1978 |
| DE | 31 29 848 A1 | 2/1983 |
| DE | 31 46 537 C1 | 6/1983 |
| DE | 44 27 074 A1 | 2/1996 |
| DE | 299 06 295 U1 | 9/1999 |
| FR | 2 595 263 A1 | 9/1987 |
| GB | 2 110 107 A | 6/1983 |
| JP | 10244119 A | 9/1998 |

\* cited by examiner

*Primary Examiner*—Robert H. Spitzer
(74) *Attorney, Agent, or Firm*—Laurence A. Greenberg; Werner H. Stemer; Gregory L. Mayback

(57) ABSTRACT

A method and a device for filtering polluted air, in which the air is successively subjected to the processes of extracting grease/fat and water, drying air still containing residual humidity, and adsorbing smells/odors. The filter device includes, in a direction of flow a vortex filter, layers of expanded metal, a filter for drying the air, and an odor filter, all in a filter housing. The filter for drying the air and the odor filter are, preferably, combined in a filter cassette that is disposed on the filter housing such that it can be changed/replaced.

39 Claims, 1 Drawing Sheet

METHOD AND DEVICE FOR FILTERING CONTAMINATED AIR

CROSS-REFERENCE TO RELATED APPLICATION

This application is a continuation of copending International Application No. PCT/EP02/05935, filed May 29, 2002, which designated the United States and was not published in English.

BACKGROUND OF THE INVENTION

Field of the Invention

The invention relates to a method for filtering contaminated air with which the degree of odor reduction can be improved, and provides a device for carrying out the method. The device is suitable primarily for employment in industrial kitchens and in fume exhaust hoods for household use.

There are known devices and methods for filtering contaminated air. For example, German Patent DE 31 46 537 C1 describes an odor filter containing active carbon as the adsorption medium, with which relatively long flow paths within the active carbon are achieved and the flow-related and suction-related relations in the fume hood are improved. In the filter, the active carbon is located in chambers that fill the interior of the filter frame and in which the chamber walls that serve as air conduction elements are inclined in the direction of the axis of suction.

The disadvantage of such odor filters is that, for one, the active carbon becomes saturated with grease residues after a relatively short operating lifetime, while, on the other hand, the adsorption capacity decreases substantially when the relative humidity of the gas stream is above only 50%.

Metal grease filters are also known, particularly, as filters in industrial kitchens and in household fume hoods. These typically are of expanded metal layers and/or, in the case of vortex or eddy current filters, of a first row of profiles that are open in the direction of the gas flow, which are disposed at intervals, and a second row of profiles that are open counter to the direction of the gas flow, which are disposed at intervals, with the adjacent longitudinal edges of two adjacent profiles of one row protruding into the interior of opposing profiles of the other row, respectively.

German Patent DE 27 20 201 C2 and U.S. Pat. No. 3,910,782 to Struble et al. describe such vortex filters. In these separating screens, the spacing between the two profile rows is dimensioned such that the passing air undergoes multiple direction reversals. The free passage cross-section equals 10–30% of the total screen area, depending on the type of separating screen. Such a reduction in cross-section within the separating screen brings about an increase of air velocity of 3–10 times. The separating effect of the screen is based on the increase of velocity, which also accelerates the liquid droplets and solid particles contained in the air, and on the multiple reversals of the direction of the passing air. The accelerated liquid droplets and solid particles are unable to follow the changes of direction and hit the inner surface of the profiles of the second row. The liquid droplets form a liquid film on the surface of the profiles, which gradually runs down, moving through special openings in the frame of the separating screen and into a collection bar disposed below the separating screen.

German Published, Non-Prosecuted Patent Application DE 44 27 074 A1 proposes the inward bending of the longitudinal edges of the profiles of the second row so as to form channels that form dead spaces into which the separated particles are drained during operation of the separating screen.

German Utility Model DE 299 06 295 U1 describes how to construct an auxiliary filter as a unit that is mechanically detachable from the vortex filter. The auxiliary filter is of a fabric filter and is disposed in back of the shell-shaped elongated baffle plates. By virtue of the detachable connection to the vortex filter, the auxiliary filter is removable and can be cleaned or replaced.

There is also a known air dehumidifier made by Henkel (a German Company) under the trade name "Ceresit Anti-Feucht" in which highly active, odorless salt crystals in a safety cartridge remove excess moisture from the ambient air and dissolve in the process.

SUMMARY OF THE INVENTION

It is accordingly an object of the invention to provide a method and device for filtering contaminated air that overcome the hereinafore-mentioned disadvantages of the heretofore-known devices and methods of this general type and that improves odor reduction and reduces humidity.

With the foregoing and other objects in view, there is provided, in accordance with the invention, a method for filtering contaminated air, in which the air passes through a filter and contaminants are separated, provides the following steps in order:

the separating of grease and water;
the drying of the air, which still contains a residual humidity; and
the adsorption of odors.

In accordance with another mode of the invention, the separating, drying, and adsorbing steps are carried out within a filter housing.

In accordance with a further mode of the invention, the drying step is carried out by drying the air with at least one of the group consisting of zeolites having a higher water affinity than active carbon, silicate gel, slowly dissolving anorganic salts, and polymer-based adsorbers.

The drying of the air is accomplished by zeolites with a higher water affinity than active carbon and/or silicate gel and/or anorganic salts, which slowly dissolve in the process, and/or by polymer-based absorbers.

In accordance with an added mode of the invention, the adsorbing step is carried out utilizing active carbon and/or zeolites.

In accordance with an additional mode of the invention, there is provided the step of collecting and cyclically or continuously removing accumulated liquid through a directly connected line.

In accordance with yet another mode of the invention, there is provided the step of collecting and one of cyclically and continuously removing accumulated liquid through a directly connected line.

With the objects of the invention in view, there is also provided a device for carrying out the method of the invention, the device having a plurality of filter elements provided for passing the contaminated air therethrough in an airflow direction and for filtering the air, the elements including a vortex filter, a grease separation filter, an air drying filter, and an odor filter consecutively disposed in the airflow direction.

In accordance with yet a further feature of the invention, the device is a household fume exhaust device.

In accordance with yet an added feature of the invention, the grease separation filter is formed from expanded metal.

In accordance with yet an additional feature of the invention, there is provided a filter housing and the air drying filter and the odor filter are combined in a filter cartridge replaceably disposed at the filter housing.

In accordance with again another feature of the invention, the vortex filter, the grease separation filter, the air drying filter, and the odor filter are combined in a filter cartridge.

In accordance with again a further feature of the invention, the vortex filter has at least one discharge opening for discharging the grease and water separated in the vortex filter.

In accordance with again an added feature of the invention, the air drying filter contains structures at which the contaminated air passes, the structures being selected from at least one of the group consisting of zeolites with a higher water affinity than active carbon, silicate gel, dissolving anorganic salts, and polymer-based absorbers.

In accordance with again an additional feature of the invention, the air drying filter has salt crystals and an open-pored plastic foam material holding the salt crystals in position.

In accordance with still another feature of the invention, the plastic foam material is open cell polyurethane foam.

In accordance with still a further feature of the invention, a salt solution accumulating in the air drying filter is discharged by way of the discharge opening.

In accordance with still an added feature of the invention, there is provided a collecting container and/or a drain line into which the discharge opening opens.

In accordance with a concomitant feature of the invention, the filter cartridge has a fill level indicator for a salt region of the cartridge.

Other features that are considered as characteristic for the invention are set forth in the appended claims.

Although the invention is illustrated and described herein as embodied in a method and device for filtering contaminated air, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
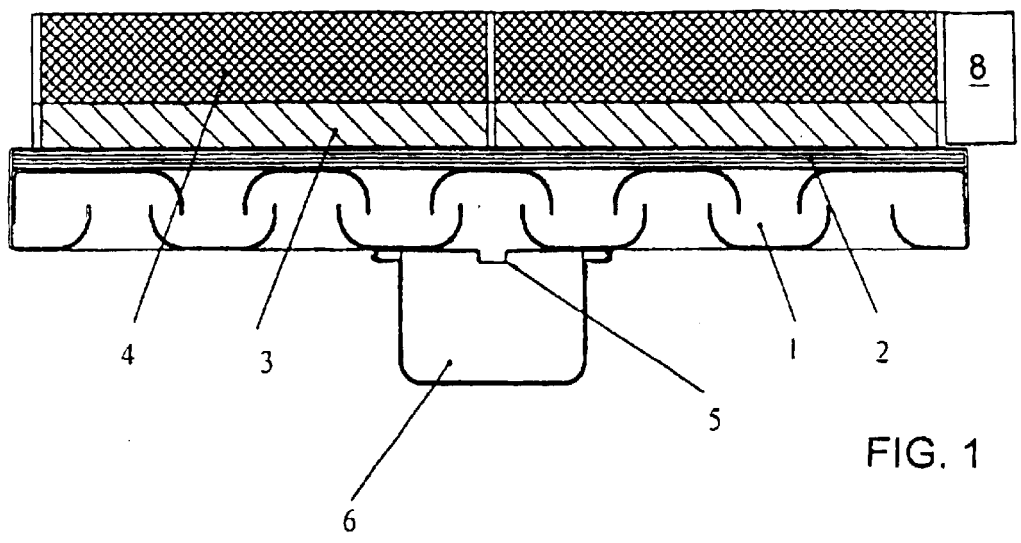
FIG. 1 is a cross-sectional view through a filter device according to the invention along section line A—A in FIG. 2.

Referring now to the figures of the drawings in detail and first, particularly to FIG. 1 thereof, there is shown the filter device having, in a direction of flow, a vortex filter 1, expanded metal layers 2, a filter 3 for drying the air, and an odor filter 4 housed in a filter housing.

The filter 3 for drying the air and the odor filter 4 are, advantageously, combined in a filter cartridge that is disposed at the filter housing in replaceable fashion. In a preferred embodiment, the filter cartridge also includes a fill level indicator 8 for a salt region so that a prompt replacement can be carried out.

The filter 3 for drying the air includes structures that can be passed by the contaminated air and that are of zeolites with a higher water affinity than active carbon and/or silicate gel and/or anorganic salts that dissolve slowly in the process and/or polymer-based absorbers.

According to an advantageous development of the invention, to prevent the subsidence of the portion of salt that remains after a certain amount has dissolved given an oblique installation position and the resulting emergence of regions in which the drying of the air is no longer guaranteed, the salt crystals, instead of being poured in as a bulk material, are embedded in an open-pored plastic foam material, for instance, open-cell polyurethane foam, which holds the salt crystals in position by embedding them therewithin.

Figure 2:
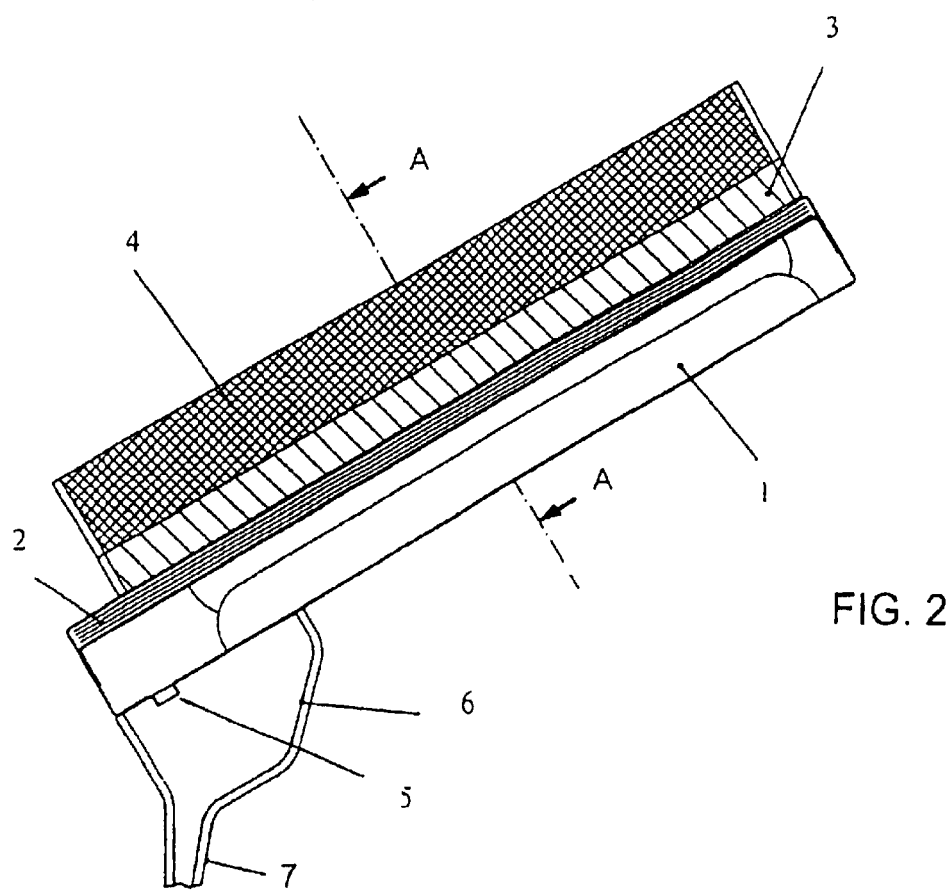
FIG. 2 is a side elevational view of the filter device according to the invention.

The vortex filter 1 has at least one discharge opening 5 into the collecting container 6 for the grease and water that are separated in the vortex filter 1. The salt solution that collects in the filter 3 can also be drained through the discharge opening 5. Accumulated liquid is collected and cyclically removed or continuously removed by way of a directly connected line 7. See FIG. 2.

Besides drying the air, the anorganic salts also bring about an elevated salt concentration in the filter region, which prevents unhygienic mildew cultures.

We claim:

1. A method for filtering contaminated air, which comprises:
    passing contaminated air through a filter and separating contaminants by consecutively:
        separating grease and water;
        drying air still containing a residual moisture; and
        adsorbing odors.

2. The method according to claim 2, which further comprises carrying out the separating, drying, and adsorbing steps within a filter housing.

3. The method according to claim 1, which further comprises carrying out the drying step by drying the air with at least one of the group consisting of zeolites having a higher water affinity than active carbon, silicate gel, slowly dissolving anorganic salts, and polymer-based adsorbers.

4. The method according to claim 3, which further comprises collecting liquid and one of cyclically and continuously removing the collected liquid through a directly connected line.

5. The method according to claim 1, which further comprises carrying out the drying step by drying the air with materials selected from at least one of the group consisting of zeolites having a higher water affinity than active carbon, silicate gel, dissolving anorganic salts, and polymer-based adsorbers.

6. The method according to claim 1, which further comprises carrying out the adsorbing step utilizing at least one of active carbon and zeolites.

7. The method according to claim 1, which further comprises collecting liquid and one of cyclically and continuously removing the collected liquid through a directly connected line.

8. A device for carrying out the method of claim 1, wherein:
    a plurality of filter elements are provided for passing the contaminated air therethrough in an airflow direction and filter the air, said elements including a vortex filter, a grease separation filter, an air drying filter, and an odor filter consecutively disposed in said airflow direction.

9. The device according to claim 8, wherein said device is a household fume exhaust device.

10. The device according to claim 9, wherein said vortex filter has at least one discharge opening for discharging the grease and water separated in said vortex filter.

11. The device according to claim 8, wherein said grease separation filter is formed from expanded metal.

12. The device according to claim 8, further comprising:
a filter housing; and
said air drying filter and said odor filter being combined in a filter cartridge replaceably disposed at said filter housing.

13. The device according to claim 12, wherein said filter cartridge has a fill level indicator for a salt region of said cartridge.

14. The device according to claim 8, wherein said vortex filter, said grease separation filter, said air drying filter, and said odor filter are combined in a filter cartridge.

15. The device according to claim 14, wherein that said air drying filter contains structures at which the contaminated air passes, said structures being selected from at least one of the group consisting of zeolites with a higher water affinity than active carbon, silicate gel, dissolving anorganic salts, and polymer-based absorbers.

16. The device according to claim 15, wherein:
said vortex filter has at least one discharge opening for discharging the grease and water separated in said vortex filter; and
a salt solution accumulating in said air drying filter is discharged by way of said discharge opening.

17. The device according to claim 16, further comprising at least one of a collecting container and a drain line into which said discharge opening opens.

18. The device according to claim 14, wherein said air drying filter has salt crystals and an open-pored plastic foam material holding said salt crystals in position.

19. The device according to claim 18, wherein said plastic foam material is open cell polyurethane foam.

20. The device according to claim 14, wherein said filter cartridge has a fill level indicator for a salt region of said cartridge.

21. The device according to claim 8, wherein said vortex filter has at least one discharge opening for discharging the grease and water separated in said vortex filter.

22. The device according to claim 21, further comprising at least one of a collecting container and a drain line into which said discharge opening opens.

23. The device according to claim 8, wherein that said air drying filter contains structures at which the contaminated air passes, said structures being selected from at least one of the group consisting of zeolites with a higher water affinity than active carbon, silicate gel, dissolving anorganic salts, and polymer-based absorbers.

24. The device according to claim 23, wherein:
said vortex filter has at least one discharge opening for discharging the grease and water separated in said vortex filter; and
a salt solution accumulating in said air drying filter is discharged by way of said discharge opening.

25. An air filtering device, comprising:
a plurality of filter elements filtering contaminated air passed therethrough in an airflow direction, said elements including a vortex filter, a grease separation filter, an air drying filter, and an odor filter disposed consecutively in said airflow direction and thereby separating contaminants by consecutively separating grease and water, drying air still containing a residual moisture, and adsorbing odors.

26. The device according to claim 25, wherein said grease separation filter is formed from expanded metal.

27. The device according to claim 25, further comprising:
a filter housing; and
said air drying filter and said odor filter being combined in a filter cartridge replaceably disposed at said filter housing.

28. The device according to claim 32, wherein said filter cartridge has a fill level indicator for a salt region of said cartridge.

29. The device according to claim 25, wherein said vortex filter, said grease separation filter, said air drying filter, and said odor filter are combined in a filter cartridge.

30. The device according to claim 29, wherein that said air drying filter contains structures at which the contaminated air passes, said structures being selected from at least one of the group consisting of zeolites with a higher water affinity than active carbon, silicate gel, dissolving anorganic salts, and polymer-based absorbers.

31. The device according to claim 30, wherein:
said vortex filter has at least one discharge opening for discharging the grease and water separated in said vortex filter; and
a salt solution accumulating in said air drying filter is discharged by way of said discharge opening.

32. The device according to claim 31, further comprising at least one of a collecting container and a drain line into which said discharge opening opens.

33. The device according to claim 29, wherein said air drying filter has salt crystals and an open-pored plastic foam material holding said salt crystals in position.

34. The device according to claim 33, wherein said plastic foam material is open cell polyurethane foam.

35. The device according to claim 29, wherein said filter cartridge has a fill level indicator for a salt region of said cartridge.

36. The device according to claim 25, wherein said vortex filter has at least one discharge opening for discharging the grease and water separated in said vortex filter.

37. The device according to claim 36, further comprising at least one of a collecting container and a drain line into which said discharge opening opens.

38. The device according to claim 25, wherein that said air drying filter contains structures at which the contaminated air passes, said structures being selected from at least one of the group consisting of zeolites with a higher water affinity than active carbon, silicate gel, dissolving anorganic salts, and polymer-based absorbers.

39. The device according to claim 38, wherein:
said vortex filter has at least one discharge opening for discharging the grease and water separated in said vortex filter; and
a salt solution accumulating in said air drying filter is discharged by way of said discharge opening.

\* \* \* \* \*